(12) United States Patent
Manabu et al.

(10) Patent No.: US 6,453,304 B1
(45) Date of Patent: Sep. 17, 2002

(54) DIGITAL INFORMATION RECORDING APPARATUS FOR RECORDING DIGITAL INFORMATION

(75) Inventors: Sasamoto Manabu, Yokohama (JP); Noguchi Takaharu, Yokohama (JP); Aikawa Makoto, Yokohama (JP); Hirahata Shigeru, Ooiso-machi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/201,757

(22) Filed: Dec. 1, 1998

(30) Foreign Application Priority Data

Dec. 15, 1997 (JP) .............................. 9-344632

(51) Int. Cl.⁷ .......................... G06F 17/60; H04K 1/00; H04L 9/00; H04N 7/167
(52) U.S. Cl. .............................. 705/57; 705/51; 705/58; 380/201; 380/203
(58) Field of Search .............................. 705/51, 57, 58; 380/201, 203

(56) References Cited

U.S. PATENT DOCUMENTS

| | | | | |
|---|---|---|---|---|
| 4,525,599 A | * | 6/1985 | Curran et al. ................. | 713/190 |
| 5,073,925 A | * | 12/1991 | Nagata et al. ................. | 360/60 |
| 5,627,655 A | * | 5/1997 | Okamoto et al. ............. | 386/94 |
| 5,757,910 A | * | 5/1998 | Rim ............................ | 380/203 |
| 5,991,500 A | * | 11/1999 | Kanota et al. ................. | 386/94 |
| 6,005,940 A | * | 12/1999 | Kulinets ....................... | 705/51 |
| 6,034,832 A | * | 3/2000 | Ichimura et al. ............... | 360/60 |
| 6,034,931 A | * | 3/2000 | Miwa et al. .................. | 369/47.12 |
| 6,128,605 A | * | 10/2000 | Saito et al. ..................... | 705/57 |
| 6,314,409 B2 | * | 11/2001 | Schneck et al. ............... | 705/54 |
| 6,347,846 B1 | * | 2/2002 | Nakamura ..................... | 380/203 |

FOREIGN PATENT DOCUMENTS

| | | | |
|---|---|---|---|
| JP | 2-7269 | | 1/1990 |
| JP | 02-007269 A | * | 1/1990 |
| WO | WO 96/18951 | * | 6/1996 |

OTHER PUBLICATIONS

Dunn, Darrell, "ST Produces DVD Encoder Chip," Electronic Buyers News, p. 3, Sep. 16, 1996.*
"Newly Developed D–VHS Digital Tape Recording System for the Multimedia Era" By M. Fujita,et al pp617–622. vol. 42, No. 3, 8/96.

* cited by examiner

*Primary Examiner*—Wynn Coggins
*Assistant Examiner*—Nicholas David Rosen
(74) *Attorney, Agent, or Firm*—Antonelli, Terry, Stout & Kraus, LLP

(57) ABSTRACT

A digital information recording apparatus to record digital information to protect copyright of digital information that includes at least first digital information and first copy control information. The digital information recording apparatus records the digital information based upon the first copy control information, which denotes one of: a copy inhibition prohibiting copying of said first digital information; a limited copy permission authorizing a predetermined number of times of copying of said first digital information; and an unlimited copy permission authorizing unlimited copying of said first digital information.

43 Claims, 9 Drawing Sheets

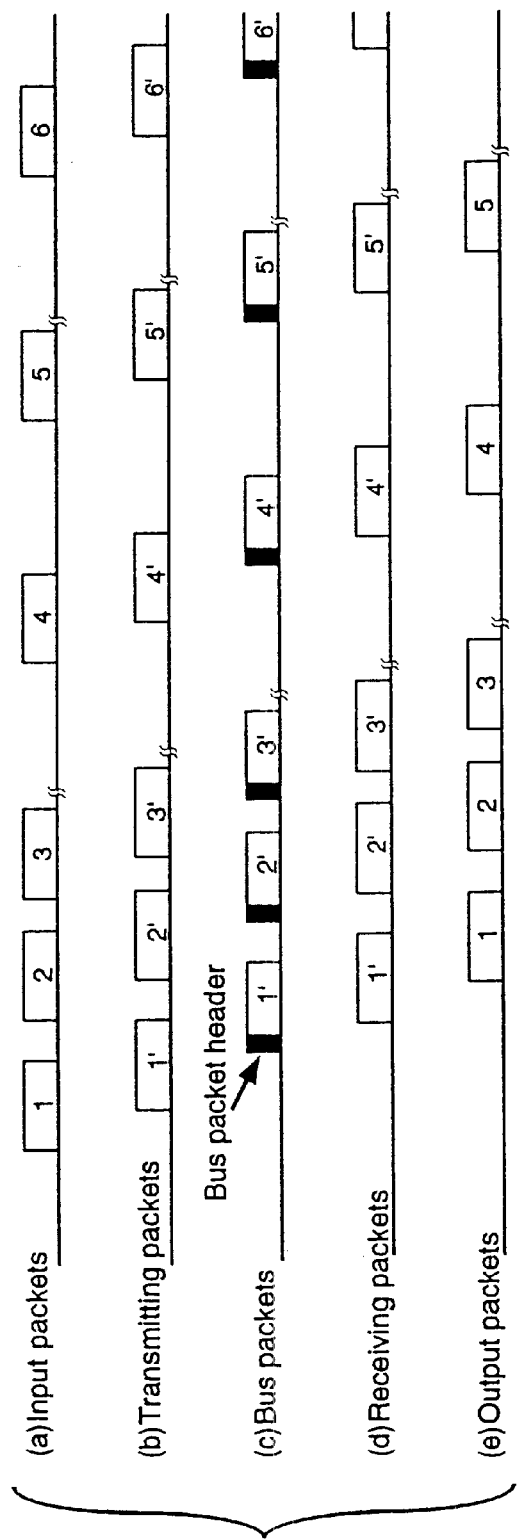

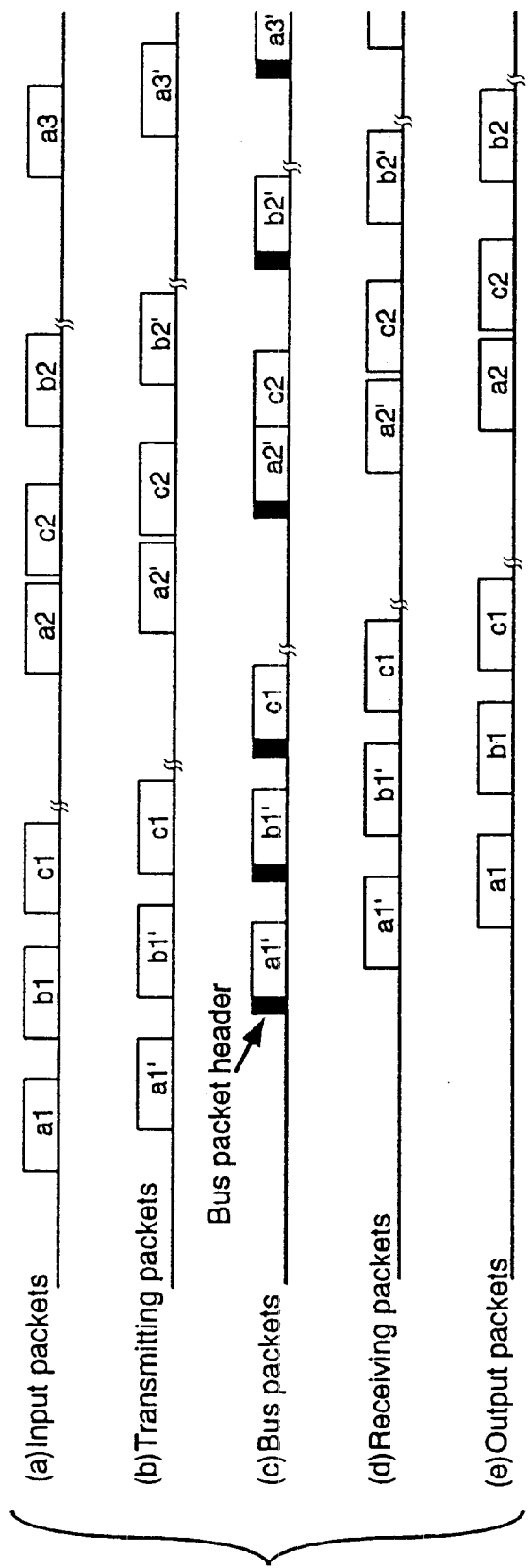

DIGITAL INFORMATION RECORDING APPARATUS FOR RECORDING DIGITAL INFORMATION

BACKGROUND OF THE INVENTION

1. Field of the Invention

This invention relates to an apparatus for protecting a copyright of digital information that is digitally transmitted between an information apparatus for home use and personal computers.

2. Description of the Related Art

Recently, the, research of data compression for a video and audio signal using digital technologies has sufficiently advanced, so that an accumulation and/or transmission of these data can be easily performed. Correspondingly, a digitalization in a field of the broadcasting has also advanced rapidly. For example, a broadcasting system in which an analog video and/or audio signal are digitally compretssed and encoded using an MPEG (Moving Picture Experts Group) standard with high-efficiency, and transmitted through a satellite and/or cable can be performed. In general, a digital-broadcasting receiver called a set-top-box is used for receiving the digital-broadcasting signal.

Furthermore, a digital VCR (Video Cassette Recorder), that can record and reproduce a video and audio information such as a digital TV broadcasting signal by employing a compression-encoding method on the magnetic tape, has been developed as an apparatus for home use to record and/or reproduce the video and audio signal.

One technology by which a requested program can be selected from received digital signals an in which plural information is multiplexed and transmitted is shown in the Japanese published unexamined patent application No. H8-56350. Moreover, one the digital VCR that uses rotation magnetic heads is shown, for example, in the Japanese published unexamined patent application No. 5-174496. Furthermore, in the publication "Newly Developed D-VHS Digital Tape Recording System for the Multimedia Era" IEEE Transactions on Consumer Electronics, Vol. 42, No.3, August 1996, pp.617–622), there are stated details about the digital broadcasting recording system in which the digital broadcasting receiver and the digital VCR are connected with a transmission line such as a digital interface. Disclosed in Japanese published unexamined patent application No. H2-7269 is technology regarding a method for protecting a copyright in a case where digital device is connected by a digital interface, respectively. In a case where copying of a digital content of an output on a digital interface is prohibited, the digital content is changed (scrambled) to different codes, and then the different codes are outputted on the digital interface. Therefore the copyright of the digital contents are somewhat protected because a digital recording apparatus, which receives the different code; doesn't have a function to decode the different codes.

When the digital broadcasting signal is recorded and reproduced by using the digital VCR, etc., there is a first disadvantage in that in transmitting the copyrighted information externally between apparatuses through the digital interface, an intercepting and/or tampering of the copyright information can occur, even if the copyright information is scrambled.

As one example, the copyrighted information can be intercepted during transmission between the apparatuses, and copy control information thereof can be modified (i.e., tampered with) so as to record the copyright information with an unauthorized copy control information, e.g. allowing unlimited (i.e., piracy) copying. Accordingly, there is a problem that the pirated copyrighted information can be used again by transmitting the information to a device with a discramble function again through a digital interface, even though further use was prohibited. Accordingly, external transmission and recording of copyright information with a prohibitive copy control information is disadvantageous in that it is susceptible to copyright piracy.

SUMMARY OF THE INVENTION

Accordingly, it is an object of the present invention to provide a digital information recording apparatus to record a digital information to protect a digital informational including copy control information on a digital transmission line.

Further, it is an object of the present invention to protect a copyright of digital contents on a digital interface.

In view of the objective of solving the problems explained above, a digital information recording apparatus to record a digital information, comprises:

separation means for separating first digital information and first copy control information from an inputted digital information including at least said first digital information and said first copy control information;

decrypt means for decrypting said first digital information outputted from said separation means;

select means for selecting said first digital information or decrypted second digital information outputted from decrypt means;

recording means for recording selected said first digital information or said decrypted second digit information; and control means for controlling at least said select means and said recording means in response to said first copy control information outputted from said separation means.

According to a preferred embodiment, a digital information recording apparatus to record a digital information, comprising:

separation means for separating first digital information and first copy control information from an inputted digital information including at least said first digital information and said first copy control information;

process means for processing said first digital information outputted from said separation means and outputting second digital information in response to control information;

recording means for recording said second digital information; and control means for controlling at least said process means and said recording means in response to said first copy control information;

wherein said control means controls said process means by said control information.

According to another embodiment, a digital information recording apparatus having a digital information output means, said digital information recording apparatus comprising:

separation means for separating first digital information and first copy control information from digital information including at least said first digital information and said first copy control information outputted from said digital information output means;

decrypt means for decrypting said first digital information outputted from said separation means;

select means for selecting said first digital information or decrypted second digital information outputted from decrypt means;

recording means for recording selected said first digital information or said decrypted second digital information; and control means for controlling at least said select means and said recording means in response to said first copy control information outputted from said separation means.

BRIEF DESCRIPTION OF THE DRAWINGS

FIG. 8 shows a timing of the packet stream of the present invention.

FIG. 9 shows a timing of the packet stream of the present invention.

DETAILED DESCRIPTION OF THE PREFERRED EMBODIMENTS

Figure 1:
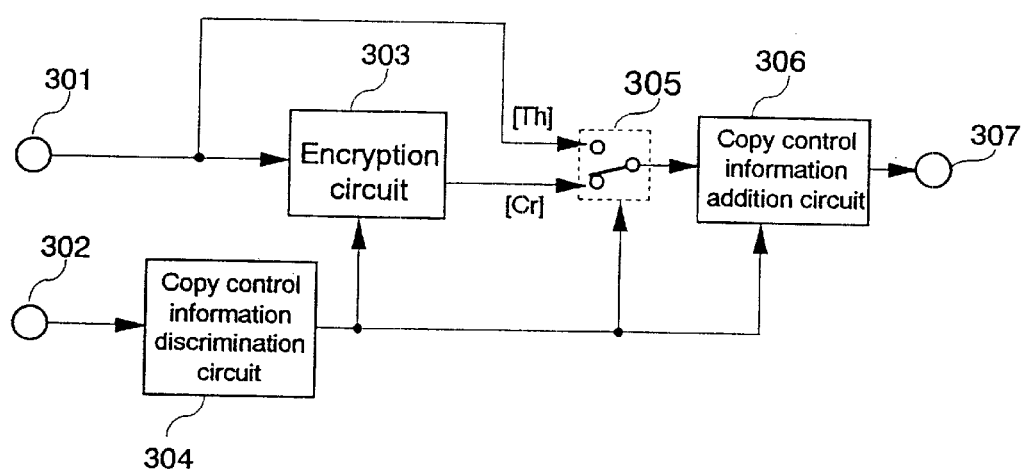
FIG. 1 shows a block diagram of a first embodiment of the present invention.

As follows, embodiments of the invention can be explained with reference to the drawings. FIG. 1 is a block diagram representation of a first embodiment of the present invention. In FIG. 1, the numerals 301, 302, 303, 304, 305, 306 and 307 denote a digital signal input terminal, a copy control information input terminal, an encryption circuit, a copy control information discrimination circuit, a selection circuit, a copy control information addition circuit and an output terminal, respectively.

A digital signal inputted from the input terminal 301 is supplied to the encryption circuit 303 and the selection circuit 305. A copy control information which relates to the digital signal from the input terminal 301 is inputted to the input terminal 302. The copy control information, for example, having a 2-bit (or greater bit) digital data, indicates an inhibition of copying, a limited permission allowing copying predetermined number of times (e.g., once) and a no-limitation allowing unlimited copying of the digital signal, e.g., with a copy control data of (1, 1), a data of (1, 0) and a data of (0, 0), respectively.

The copy control information discrimination circuit 304 performs a discrimination procedure base on the copy control information from the input terminal 302, and if the copy control information is discriminated as the data of (1, 1) or (1, 0) which denotes an inhibition or a limited permission while the encryption circuit 303 works actively, the selection circuit 305 is switched to a terminal Cr so as to cause encrypted information to pass therethrough.

And by the discrimination procedure if the copy control information is discriminated as the data of (0, 0) which denotes a no-limitation for copy, while the encryption circuit 303 work inertly to stop its performance, the selection circuit 305 is switched to a terminal Th.

The encryption circuit 303 encrypts the inputted digital signal with a predetermined encryption key which may be usually renewed minute by minute, and outputs the encrypted digital signal. To prevent an error propagation which influences the following data even if some errors like a bit-error are caused on a transmission, for example, in the encryption circuit 303 a block encryption algorithm is employed by which a block unit consisted of a plural number of bits is used so that the encryption processing is realized with a simplified circuit.

Figure 2:
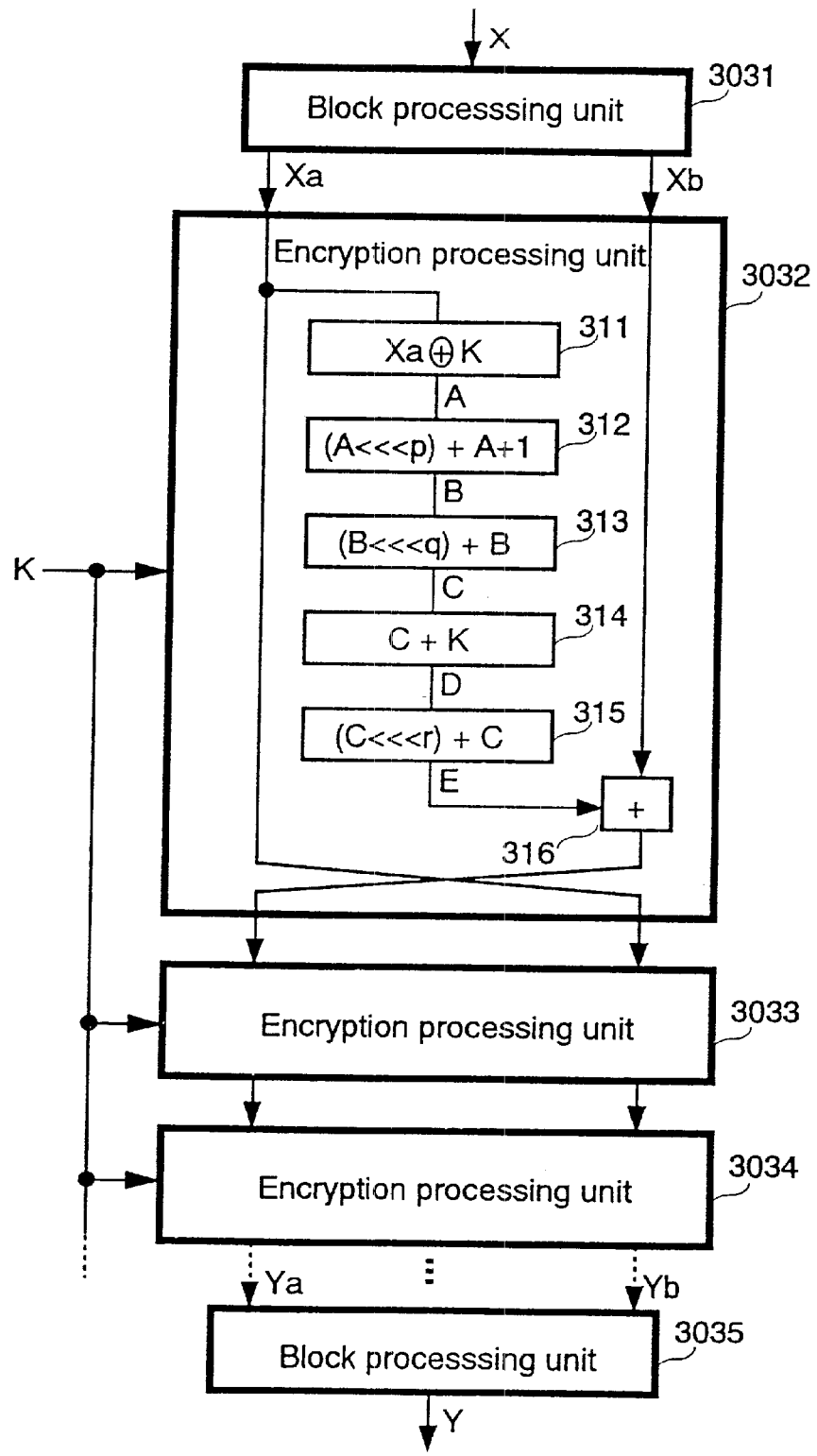
FIG. 2 shows one of the embodiment of the encryption circuit of the present invention.

One embodiment the encryption circuit 303 is shown in FIG. 2. In FIG. 2, 3031 and 3035 denote a block processing unit respectively, 3032, 3033, and 3034 denote a encrypton processing unit respectively in which Xa and Xb show upper-significant and lower-significant bits of an input block data X respectively, Ya and Yb show an encrypted data respectively and K shows an encryption key. As shown in FIG. 2, the input data X is converted to blocks consisted of a plural number of bits in the block processing unit 3031. For example, the one block is composed of 64 bits in which the Xa and Xb are outputted as the 32 upper significant bits and the 32 lower-significant bits respectively. In the encryption processing unit 3032, the inputted data Xa and Xb are processed by an exclusive-or processing which is shown as a numeral 311, by bit-shift and bit-add processings which are shown as numerals 312, 313 and 315, in which a symbol A<<<p means that A is cyclic-bit-shifted to the left direction by a number p of bits, and by bit-add processings which are shown as numerals 314 and 316. Processing results therefrom are then inputted to the following connected encryption processing units which are shown as numerals 3033 and 3034, and furthermore their outputs are inputted for processing by other encryption processing units which are not shown in FIG. 2. As a result, the encrypted data Ya and Yb can be obtained from their processing units with repeated performing of encryption processings in a plural number of steps.

In the block processing unit 3035, a block sequence of the data Ya and Yb are converted to become the same as the original bit sequence, and the encrypted data Y is outputted from the block processing unit 3035. Moreover, although not illustrated, the above-mentioned processings can be suspended and consumption electric power caused by their processings can be reduced according to an external signal by stopping supply of a clock signal used as a standard signal for processings such as an add processing, or by setting to a hold-mode an enable signal which selects whether to latch or hold an inputted data to a register for holding a processing result.

In FIG. 1, the copy control information addition circuit 306 adds the copy control information inputted from the input terminal 302 to the output data from the selection circuit 305. Such can be realized, for example, by adding and storing the copy control information in a head of the output data as a header. After these processings the output data is outputted from the output terminal 307.

By the above-mentioned encrypting operations, unless a decryption processing is performed to reverse encryption, any work can be copyright protected from an intercepting and/or a tampering since the digital signal regarding such copyrighted work can be encrypted. In addition, since the encryption processing is not performed when the copy control information indicates unlimited copying of a work, the work can be used freely.

In addition, in this embodiment, although switching is outside of the encryption circuit 303 whether the encryption processing is performed or not for the digital signal, switching and the same processing may be performed in the inside of the encryption circuit 303.

Figure 3:
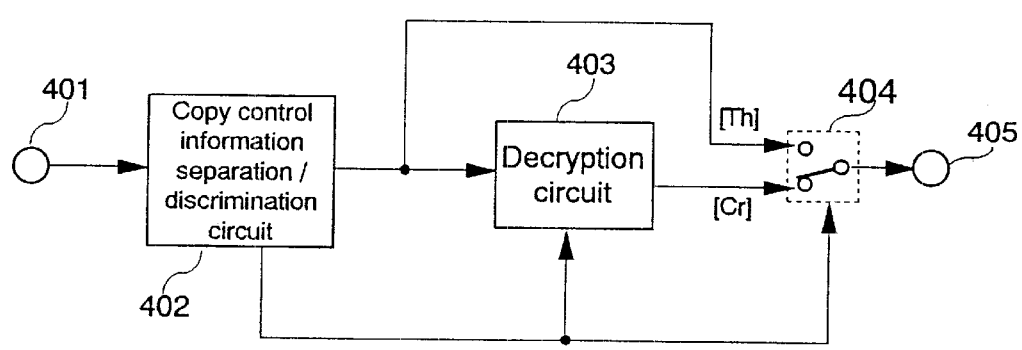
FIG. 3 shows a block diagram of a second embodiment of the present invention.

FIG. 3 is a block diagram representation of another embodiment of the present invention. Such embodiment corresponds to a digital information receiving apparatus as opposed to the sending-end apparatus embodiment as shown in FIG. 1.

In FIG. 3, the numerals 401, 402, 403, 404 and 405 denote a digital signal input terminal, a copy control information separation discrimination circuit, a decryption circuit, a selection circuit and an output terminal, respectively.

In the copy control information separation discrimination circuit 402, from the digital signal inputted from the input terminal 401, the copy control information added by said embodiment as shown in FIG. 1 is separated and the remaining digital signal is outputted from the circuit 402. A discrimination procedure is performed based on the separated copy control information. If the copy control information is discriminated as the data of (1, 1) or (1, 0) which denotes an inhibition or a limited permission, respectively, the decryption circuit 403 is controlled actively to actively decrypt, and the selection circuit 404 is switched to a terminal Cr. If the copy control information is detected as the data of (0, 0) which denotes an unlimited copying, the decryption circuit 403 is controlled to stop its performance, and the selector 404 is switched to the terminal Th.

The decryption circuit 403 decrypts the inputted digital signal with a predetermined decryption key which is the same as a encryption key added by the encryption circuit 303 of said first embodiment as shown in FIG. 1, and outputs the decrypted digital signal. For a decryption method, for example, an algorithm can be used by which some processings such as a bit shift processing and a bit substitution processing are repeatedly performed i.e., with a reverse decryption processing corresponding to the encryption processing of the first embodiment as shown in FIG. 1.

As a result of the above-mentioned procedures, the digital signal whose copyright has to be protected can be performed with the decryption and outputted, and if the copy control information indicates a permission for copying, the digital signal can be outputted with no decryption.

As shown in said first and second embodiments, for example, when the output terminal 307 in FIG. 1 and the input terminal 401 in FIG. 3 are connected using a digital bus, since the digital signal whose copyright of a work has to be protected is encrypted and transmitted via the bus, the copyright of the work can be protected from actions such as intercepting and tampering.

Figure 4:
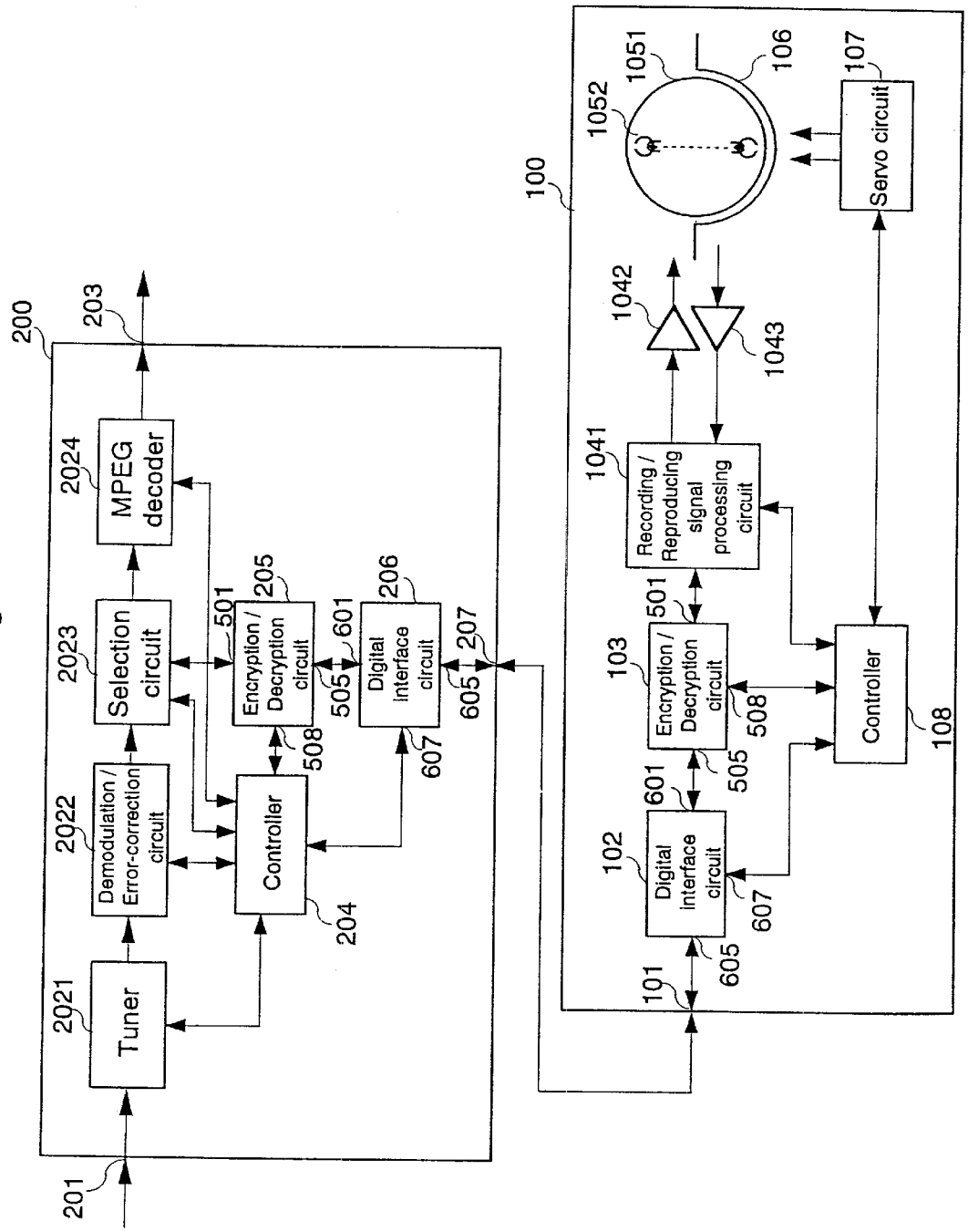
FIG. 4 shows a block diagram of a third embodiment of the present invention.

FIG. 4 is a block diagram representation of a third exemplary embodiment of the present invention. A digital signal, for example, by using the MPEG2 international standard is treated in the embodiment.

In FIG. 4, the numerals 100, 200, 101, 102, 103, 1041, 1042, 1043, 1051, 1052, 106, 107 and 108 denote a recording and reproducing unit, a digital broadcasting signal receiving unit, an input and output terminal for a signal such as a digital broadcasting signal, a digital interface circuit, an encryption and decryption circuit, a recording and reproducing signal processing circuit, a recording amplifier, a reproducing amplifier, a rotary drum, magnetic heads, a magnetic tape, a servo control circuit, and a controller, respectively. Furthermore the numerals 201, 2021, 2022, 2023, 2024, 203, 204, 205, 206 and 207 denote an input terminal which inputs a digital broadcasting signal, a tuner, a demodulation and error-correction circuit, a selection circuit, a MPEG decoder, a video and audio signal output terminal, a controller, an encryption and decryption circuit, a digital interface circuit and an input and output terminal of a signal such as a digital broadcasting signal, respectively.

The digital broadcasting signal sent by a broadcasting station is inputted into the digital broadcasting signal receiving unit 200 from the input terminal 201. The digital broadcasting signal, for example, is supplied through a digital broadcasting satellite, a terrestial broadcasting or a cable broadcasting or any other suitable arrangement. Here it is presupposed that a video and audio signal are compressed in a packet form with the MPEG system by a broadcasting station.

Figure 5:
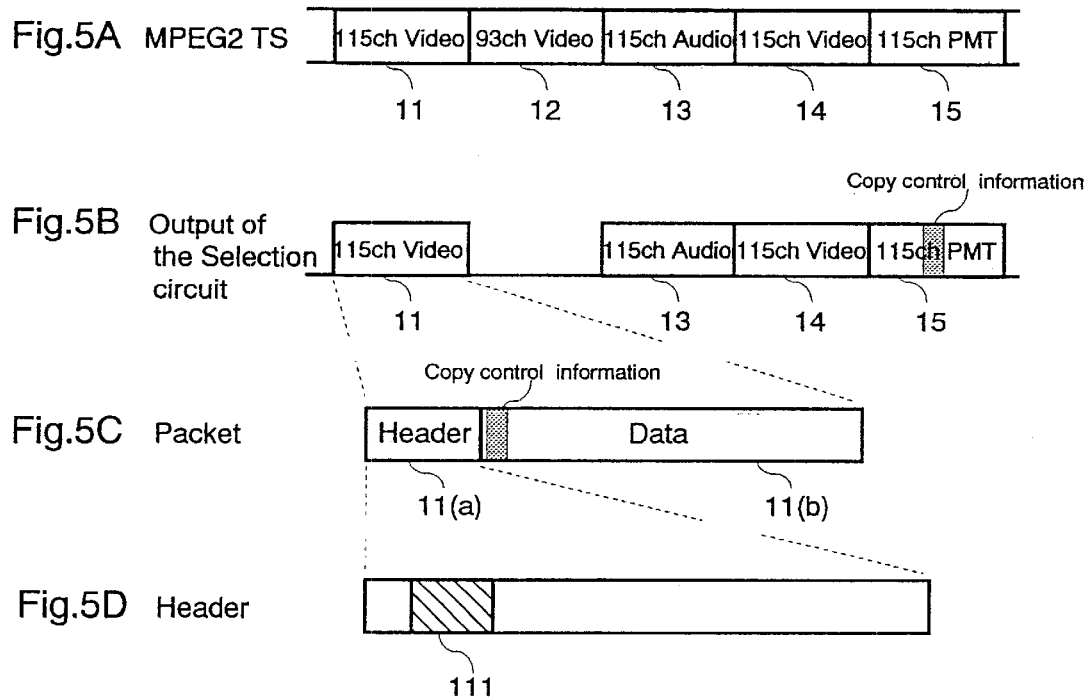
FIG. 5 shows a block diagram of a multiplexing method of the packet of the present invention.

FIG. 5A, FIG. 5B, FIG. 5C and FIG. 5D illustrate one embodiment of the packet form of the video and audio signal. The inputted broadcasting signal can be received by the tuner 2021 and be tuned and detected at a point of predetermined broadcasting frequency by the controller 204. The detected receiving signal which is modulated, for example, by using a modulation system such as a quadrature phase shift keying (QPSK) can be demodulated and performed with an error correcting procedure in the demodulation and error-correction circuit 2022. As shown in FIG. 5A, the digital signal obtained by the demodulation and error-correction circuit 2022 has a form of a multiplexed signal in which signals such as a plural number of channels of compressed video and audio signal are multiplexed with the packet form, so as to form a Transport Stream (TS). A size of the packet form, for example, can be specified to 188 bytes in case of the MPEG2 standard.

As shown in FIG. 5B, the selection circuit 2023 selects and takes out only packets required to decode the video and audio signal, whose channel is specified by the controller 204, from the TS demodulated by the demodulation and error-correction circuit 2022.

The procedure flow working in the selection circuit 2023 is shown as follows. At first, a user inputs a logical channel of a desired audio-visual program. Here a logical channel means means a collection of video and audio information constituting one program, and can, for example, correspond to a television channel used by an analog television broadcasting. Moreover, in general, a frequency band in which a plural number of programs are multiplexed is called as a logical channel in the digital broadcasting system. Next, a program association table, that is called PAT, which is contained in the present received TS is received.

The PAT indicates one table in program specific information called PSI, specified by the MPEG2 standard. A packet identification, that is called PID and indicates an identification number of packet in which specified logical channel of video and audio information is contained, is described in a program map table called PMT. The PMT is also a table of the PSI. Described in the PMT are: PID of the packet such as a video and audio signal, which constitutes each logical channel included in the received TS, and a program clock reference, that is called PCR and indicates the time information timed by a reference clock signal used at the time of the compression of the video and audio signal. Moreover the copy control information of each logical channel is stored in the PMT. If the PAT is received, the PID is taken out from the PAT, and the PMT including the PID is received. As shown in FIG. 5(c), each packet of the TS is mainly constituted with a header 11(a) and a data 11(b). As shown in FIG. 5(d), PID of 111 which indicates an ID number of the packet is stored in the header 11(a). Copy control information can be included at any appropriate location within the transmitted/received information e.g., copy control information can be included within a separate packet (shown in dotted form) in the FIG. 5B. Transport stream, or may be included within a data or header portion (again shown in dotted form) in some or all of the program data packets as shown in FIG. 5C.

As mentioned above, in order to discriminate which information such as a video, audio and the PCR constitute a logical channel are stored in each packet, it is required to acquire the PID.

The selection circuit 2023 supplies packet-stream in which a video and audio signal are stored to the MPEG decoder 2024. The MPEG decoder 2024 expands the compressed video and audio signal, and restores them. The restored video and audio signal are outputted from the output terminal 203. A user can view and listen them through a monitor television.

Hereafter, the recording process of information in the recording and reproducing unit 100 is explained using FIG. 4, FIG. 6, FIG. 7 FIG. 8 and others.

The selection circuit 2023 supplies a packet stream of a specified logical channel in which a video signal, audio signal, PSI, PCR and others are contained to the digital interface circuit 206 through the encryption and decryption circuit 205.

On the other side, the selection circuit 2023 transmits a copy control information of the PMT packet of the channel to the encryption and decryption circuit 205 and the digital interface circuit 206 via the controller 204.

The packet train, which is outputted from the selection circuit 2023 and encrypted by the encryption and decryption circuit 103, 205, is supplied to the encryption and decryprion circuit 103 in the recording and reproducing circuit 100 through the input and output terminal 207 and 101, and the digital interface circuit 102.

Figure 6:
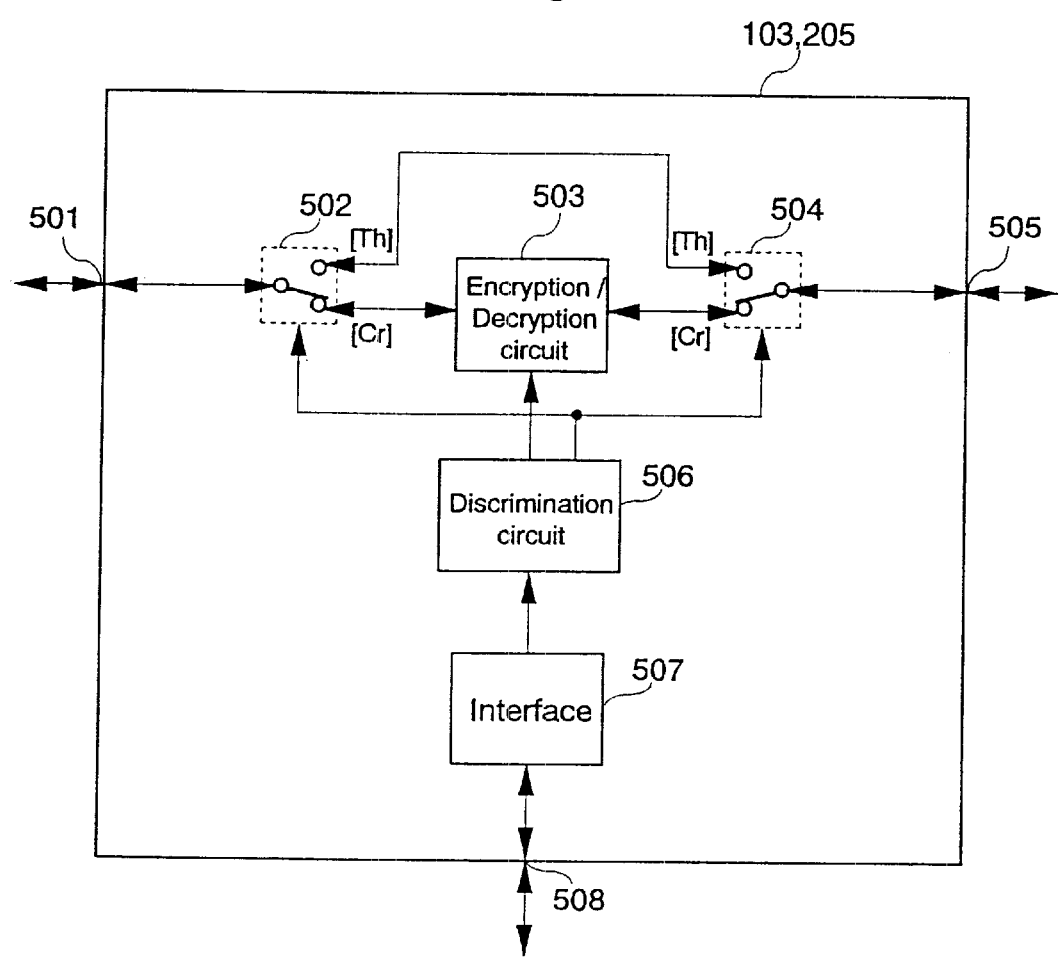
FIG. 6 shows one of the embodiment of the encryption/decryption circuit of the present invention.
Figure 7:
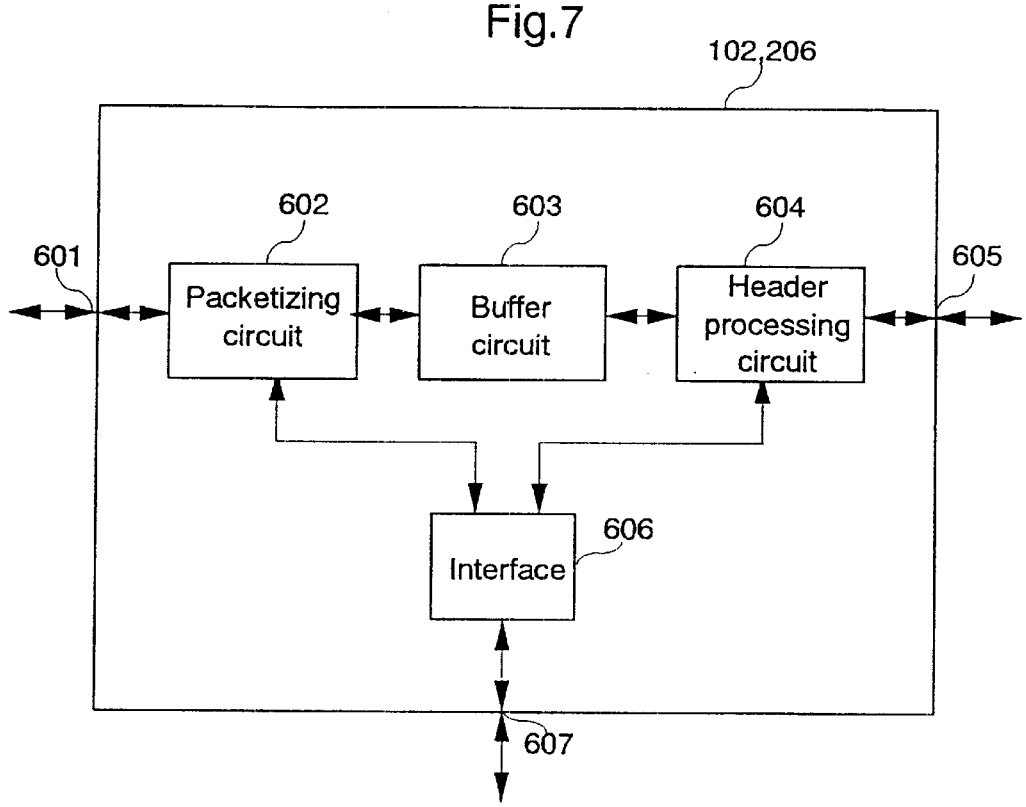
FIG. 7 shows one of the embodiment of the digital interface circuit of the present invention.

FIG. 6 shows a block diagram representation of one embodiment of the encryption and decryption circuit 205 and 103. Functions of each block are as follows:

The numerals 501, 505 and 508 are input and output terminals, respectively. The numerals 502 and 504 are selection circuits, respectively. The numerals 503, 506, 507 are an encryption and decryption circuit, a discrimination circuit for the copy control information, and an external interface circuit. In the encryption and decryption circuit 205, the copy control information submitted from the controller 204 is sent to the copy control information discrimination circuit 506, via a input and output terminal 508 and a external interface circuit 507.

The discrimination circuit for copy control information 506 switches the encryption and decrypti)n circuit 503 and selectors 502 and 504 according to the copy control information. For example, if copy control information is "11" or "10", which means copying is forbidden or permitted only once, as the first example, selector 502 and 504 are switched to a Cr side and the encryption and decryption circuit 503 is ready to work for coding or decoding signals. And if copy control information is "00", which means copies are permitted without any limitation, 503 is set to stop its work while switches 502 and 504 are turned to a Th side.

In the encryption and decryption circuit 205 shown in FIG. 6 digital signal submitted from input and output terminal 501 is transmitted directly to input and output terminal 505, or transmitted to input and output terminal 505 after being encoded in encryption and decryption circuit 503 depending on the copy control information accepted from controller 108.

On the other hand, in the encryption and decryption circuit 103 of the recording/reproducing equipment 200, a digital signal submitted from input and output terminal 505 is transmitted to input and output terminal 501 either directly or after decoding in encryption and decryption circuit 503, depending upon the copy control information accepted from 108. A cipher key used for encryption and decryption is accepted from interface circuit 507 in both cases.

The digital interface circuit 206 of the recording and reproducing unit 100 or 102 of the recording/reproducing device 200 realize a protocol of a fast digital bus interface such as IEEE 1394. It simultaneously has a function of transmitting a fast signal while keeping the time interval of the transmitted packet stream constant.

In FIG. 7, 601, 605 and 607 are the input and output terminals, 602 is a packetizing circuit, 603 is a buffer, 604 is a header processing circuit and 606 is an external interface circuit. In this Figure, the encryption and decryption circuit is connected to the input and output terminal 601, and a digital bus interface to the input and output terminal 605. In the digital interface circuit 206, packet stream sent from encryption and decryption circuit 205 is added to the packetizing circuit 602 via input and output circuit 602, where the arriving time of each packet to 602 is added to the header of each packet as a time stamp, which can be used to maintain the time interval of the packet stream.

The packet stream to which time stamps were added is stored in buffer circuit 603. They are processed as bus-packets and sent out on a digital bus interface. The header processing circuit 604 adds copy control information received from controller 204, size of the packet, error correction symbols and others to the packets, which are original packet received by buffer 603 itself, an unified (i.e. combined) packet made of some packets received by 603, or a partial packet divided packet from a received packet. After that they are sent to the digital bus interface.

On the other hand, signal processing in the digital interface circuit 102 is as follows. Header processing circuit 604 reads out the copy control information of the packet received from input and output circuit 605, which was added by the header processing circuit 604 in the digital interface circuit 605, and sends the information to controller 108 via external interface circuit 606. At the same time, the header processing circuit 604 reads out packet size information, error information and others of the received packet and sends the same to the buffer circuit 603. Divided packets are constructed into the original form and outputted from this block in the timing as written in a same time stamps that are added at the top of each packet.

As shown in FIG. 4, an logical channel of the packet enciphered by the encryption and decryption circuit 205 of the receiver 200 after having outputted from selector 2023 is outputted from the input and output terminal 207. It is supplied to the input and output terminal 101 of the recording/reproducing device 100, and transmitted to the encryption and decryption circuit 103 via digital interface circuit 102, where it is decoded.

FIG. 8 shows timing charts of the packet streams in each processing step such as from input to encryption and decryption circuit, to output from encryption and decryption circuit 103. The packet train submitted to the encryption and decryption circuit 205 (FIG. 8(a)) is enciphered by the encryption and decryption: circuit 206 (FIG. 8(b)), and after that a header is added in the digital interface circuit 206 for sending to the digital bus interface (FIG. 8(*c*)). The packet stream is accepted by digital interface circuit 102, which then separates their headers there. The received packets are decoded at the encryption and decryption circuit 103 to the original packet stream. Naturally if copying is allowable, no encipherment is carried out.

In FIG. 8 one logical packet stream is explained as an example, however, the present invention is not limited thereto. When a packet stream consisting of several channels are transmitted on the digital interface circuit, signal processing for each packet is made depending upon the copy control information of each packet.

FIG. 9 shows timing charts of a packet stream when they are consist of several channels. For example, if aCH has copy control information prohibiting copying, bCH has control information allowing a limited number of copies and cCH has control information allowing unlimited copying, in this case, encoding is performed for aCH and bCH, but cCH is transmitted without any encoding. Some extra delay is added to cCH to realize a same timing as aCH and bCH. Furthermore, when, for example, a packet of aCH and that of cCH are transmitted as a combined packet, the copy control information of each channel is stored in same packet header. Even in such a case, an acceptor side encode of aCH channel packet is prevented and no encoding is made for cCH packet after reading the information in the packet header. Using this process, an acceptor side can read cCH signal without encoding circuit, but it can accept aCH and/or bCH only after encoding them.

A signal processing process of recording/reproducing device 100 will be explained using FIG. 4. Encryption and decryption circuit 103 which transmits a decoded packet train to recording/reproducing signal processing circuit 1041. The recording/reproducing signal processing circuit 1041 adds copy control information received from 108, a proper control sign and an error collection signal and others to it, and sends the same to recording amplifier 1042 as a recording signal. In this process, copy control information that is to be recorded, has been modified as follows; if "10", which means that only a signal copying was permitted by the original control information, then recording information is changed to "11", which subsequently prohibits copying; if original control information is "00", a same "00" is recorded. When copy control information is "11", then the recording itself is stopped.

Servo circuit 107 controls the rotary phase of rotating drum 1051, and signals are recorded on the proper recording tracks on magnetic tape 106 by magnetic head 1052 mounted on rotating drum 1051.

A program that a user selects can be recorded on the magnetic tape by the above-mentioned processing. Because enciphered information is transmitted on the digital bus interface, an electrical interception and a falsification can be prevented.

Next, a reproducing process will be explained. Servo circuit 107 controls the rotary phase of rotating drum 1051. Magnetic heads that scan the signal track of the magnetic tape 106 reads out a reproducing signal, and such signal is transmitted to recording/reproducing signal processing circuit 1041 after being amplified by reproducing amplifier 1052. The recording/reproducing signal processing circuit 1041 performs error correction for the reproducing signal, then recreates packets. In this process, the tape copy control information stored on the magnetic tape at a recording process is reproduced and transmitted to the controller.

The reproducing packets stream is decoded by encryption and decryption circuit 206 depending upon the copy control information, and sent to the digital bus interface; after adding the copy control information by the digital interface circuit 102. The digital interface circuit 206 separates the copy control information while maintaining a time interval. Then they are decoded depending upon the copy control information and transmitted to selector 2023. These signals can be used by the user as the received broadcast signal. With such arrangement, a processes signal on the digital bus interface is encoded so as to be protected from electrical interception and falsification.

In this executed example of the invention, there has been adapted an example of the magnetic recording device with a helical scanning head as a recording/reproducing device. However the invention is not restricted to it but it can be applied to other devices, for example those with optical disk memory or semiconductor memory. Furthermore, IEEE1394 is shown as an example of the digital interface circuit, but the invention is not limited to this digital interface circuit, but other interface standards or arrangements are likewise applicable. In the executed example of the invention, one tuner for digital broadcast is shown connected to one recording/reproducing device; however, this invention has no reason to be restricted to such case, but it can be applied to any other possible connection. For example, as a connection between a tuner of digital broadcast and a computer, one between a computer and a recording/reproducing device, and a connection using a daisy chain between a digital tuner and several devices.

As explained above, this invention makes it possible to protect copyright of digital contents transmitted through a digital transmission line.

What is claimed is:

1. A digital information recording apparatus for recording a digital information, comprising:

separation means for separating first digital information and first copy control information from an inputted digital information signal including at least said first digital information and said first copy control information;

decrypt means for decrypting said first digital information outputted from said separation means to produce decrypted second digital information;

select means for selecting one of said first digital information and said decrypted second digital information from said decrypt means;

recording means for recording a selected one of said first digital information and said decrypted second digital information received from said select means; and control means for controlling at least said select means and said recording means in response to said first copy control information received from said separation means.

2. A digital information recording apparatus according to claim 1, wherein:

said control means controls said decrypt means, said select means and said recording means in response to first copy control information outputted from said separation means.

3. A digital information recording apparatus according to claim 1, wherein:

said control means controls said separation means, said select means and said recording means in response to first copy control information outputted from said separation means.

4. A digital information recording apparatus according to claim 1, wherein:
said control means controls said separation means, said decrypt means, said select means and said recording means in response to first copy control information outputted from said separation means.

5. A digital information recording apparatus according to claim 1, wherein:
said first digital information includes at least one of encrypted information and non-encrypted information.

6. A digital information recording apparatus according to claim 1, wherein:
said first copy control information denotes one of:
a copy inhibition prohibiting copying of said first digital information;
a limited copy permission authorizing a predetermined number of times of copying of said first digital information; and
an unlimited copy permission authorizing unlimited copying of said first digital information.

7. A digital information recording apparatus according to claim 1, wherein:
said control means controls said select means so as to select said first digital information outputted from said separation means in response to said unlimited copy permission authorizing unlimited copying of said first digital information; and
said control means controls said select means so as to select said decrypted second digital information outputted from said decrypt means in response to said limited copy permission authorizing a predetermined number of times of copying of said first digital information.

8. A digital information recording apparatus according to claim 1, further comprising:
altering means for altering said first copy control information into second copy control information in response to said first copy control information;
wherein said control means controls said recording means so as to record a selected one of said first digital information and said decrypted second digital information as well as said second copy control information.

9. A digital information recording apparatus according to claim 8, wherein:
said first copy control information denotes one of:
a copy inhibition prohibiting copying of said first digital information;
a limited copy permission authorizing a predetermined number of times of copying of said first digital information; and
an unlimited copy permission authorizing unlimited copying of said first digital information.

10. A digital information recording apparatus according to claim 9, wherein:
said altering means, upon reaching said predetermined number of times of copying, alters said limited copy permission authorizing a predetermined number of times of copying of said first digital information into said copy inhibition of said first digital information as said second copy control information in response to said first copy control information.

11. A digital information recording apparatus according to claim 1, further comprising:
altering means for altering said first copy control information into second copy control information in response to said first copy control information;
wherein said control means controls said recording means so as to record said second digital information as well as said second copy control information.

12. A digital information recording apparatus according to claim 11, wherein:
said first copy control information denotes one of:
a copy inhibition prohibiting copying of said first digital information;
a limited copy permission authorizing a predetermined number of times of copying of said first digital information; and
an unlimited copy permission authorizing unlimited copying of said first digital information.

13. A digital information recording apparatus according to claim 12, wherein:
said altering means, upon reaching said predetermined number of times of copying, alters said limited copy permission authorizing a predetermined number of times of copying of said first digital information into said copy inhibition of said first digital information as said second copy control information in response to said first copy control information.

14. A digital information recording apparatus having a digital information output means, said digital information recording apparatus comprising:
separation means for separating first digital information and first copy control information from a digital information signal, including at least said first digital information and said first copy control information, outputted from said digital information receiving means;
decrypt means for decrypting said first digital information outputted from said separation means to produce decrypted second digital information;
select means for selecting said first digital information or said decrypted second digital information outputted from said decrypt means;
recording means for recording selected one of said first digital information and said decrypted second digital information; and
control means for controlling at least said select means and said recording means in response to said first copy control information received from said separation means.

15. A digital information recording apparatus according to claim 14, wherein:
said control means controls said decrypt means, said select means and said recording means in response to said first copy control information outputted from said separation means.

16. A digital information recording apparatus according to claim 14, wherein:
said control means controls said separation means, said select means and said recording means in response to said first copy control information outputted from said separation means.

17. A digital information recording apparatus according to claim 14, wherein:
said control means controls said separation means, said decrypt means, said select means and said recording means in response to said first copy control information outputted from said separation means.

18. A digital information recording apparatus according to claim 14, wherein:
said first digital information includes at least one of encrypted information and non-encrypted information.

19. A digital information recording apparatus according to claim 14, wherein:
said first copy control information denotes one of:
a copy inhibition prohibiting copying of said first digital information;
a limited copy permission authorizing a predetermined number of times of copying of said first digital information; and
an unlimited copy permission authorizing unlimited copying of said first digital information.

20. A digital information recording apparatus according to claim 14, wherein:
said control means controls said select means so as to select said first digital information outputted from said separation means in response to said unlimited copy permission authorizing unlimited copying of said first digital information; and
said control means controls said select means so as to select said decrypted second digital information outputted from said decrypt means in response to said limited copy permission authorizing a predetermined number of times of copying of said first digital information.

21. A digital information recording apparatus according to claim 14, further comprising:
altering means for altering said first copy control information into second copy control information in response to said first copy control information;
wherein said control means controls said recording means so as to record a selected one of said first digital information and said decrypted second digital information as well as said second copy control information.

22. A digital information recording apparatus according to claim 21, wherein:
said first copy control information denotes one of:
a copy inhibition prohibiting copying of said first digital information;
a limited copy permission authorizing a predetermined number of times of copying of said first digital information: and
an unlimited copy permission authorizing unlimited copying of said first digital information.

23. A digital information recording apparatus according to claim 22, wherein:
said altering means, upon reaching said predetermined number of times of copying, alters said limited copy permission authorizing a predetermined number of times of copying of said first digital information into said copy inhibition of said first digital information as said second copy control information in response to said first copy control information.

24. A digital information recording apparatus to record a digital information, comprising:
a digital interface circuit to separate first digital information and first copy control information from an inputted digital information signal, including at least said first digital information and said first copy control information;
a decryptor to decrypt said first digital information outputted from said digital interface circuit so as to produce decrypted second digital information;
a selector to select one of said first digital information and decrypted second digital information outputted from decryptor;
a recorder to record a selected one of said first digital information and said decrypted second digital information received from said selector; and
a controller to control at least said selector and said recorder in response to said first copy control information received from said digital interface circuit.

25. A digital information recording apparatus according to claim 24, wherein:
said controller controls said decryptor, said selector and said recorder in response to said first copy control information outputted from said digital interface circuit.

26. A digital information recording apparatus according to claim 24, wherein:
said controller controls said digital interface circuit, said selector and said recorder in response to said first copy control information outputted from said digital interface circuit.

27. A digital information recording apparatus according to claim 24, wherein:
said controller controls said digital interface circuit, said decryptor, said selector and said recorder in response to said first copy control information outputted from said digital interface circuit.

28. A digital information recording apparatus according to claim 24, wherein:
said first digital information includes at least one of encrypted information and non-encrypted information.

29. A digital information recording apparatus according to claim 24, wherein:
said first copy control information denotes one of:
a copy inhibition prohibiting copying of said first digital information;
a limited copy permission authorizing a predetermined number of times of copying of said first digital information; and
an unlimited copy permission authorizing unlimited copying of said first digital information.

30. A digital information recording apparatus according to claim 24, wherein:
said controller controls said selector so as to select said first digital information outputted from said digital interface circuit in response to said unlimited copy permission authorizing unlimited copying of said first digital information; and
said controller controls said selector so as to select said decrypted second digital information outputted from said decryptor in response to said limited copy permission authorizing a predetermined number of times of copying of said first digital information.

31. A digital information recording apparatus according to claim 24, further comprising:
a copy modifier adapted to modify said first copy control information into second copy control information in response to said first copy control information;
wherein said controller controls said recorder so as to record a selected one of said first digital information and said decrypted second digital information as well as said second copy control information.

32. A digital information recording apparatus according to claim 31, wherein:
said first copy control information denotes one of:
a copy inhibition prohibiting copying of said first digital information;
a limited copy permission authorizing a predetermined number of times of copying of said first digital information; and
an unlimited copy permission authorizing unlimited copying of said first digital information.

33. A digital information recording apparatus according to claim 32, wherein:

said copy modifier, upon reaching said predetermined number of times of copying, modifies said limited copy permission authorizing a predetermined number of times of copying of said first digital information into said copy inhibition of said first digital information as said second copy control information in response to said first copy control information.

34. A digital information recording apparatus having a digital information receiver, said digital information recording apparatus comprising:

a digital interface circuit to separate first digital information and first copy control information from a digital information signal, including at least said first digital information and said first copy control information, outputted from said digital information receiver;

a decryptor to decrypt said first digital information outputted from said digital interface circuit so as to produce decrypted second digital information;

a selector to select said first digital information or said decrypted second digital information outputted from said decryptor;

a recorder to record a selected one of said first digital information and said decrypted second digital information; and a controller to control at least said digital interface circuit and said recorder in response to said first copy control information outputted from said digital interface circuit.

35. A digital information recording apparatus according to claim 34, wherein:

said controller controls said decryptor, said selector and said recorder in response to said first copy control information outputted from said digital interface circuit.

36. A digital information recording apparatus according to claim 34, wherein:

said controller controls said digital interface circuit, said selector and said recorder in response to said first copy control information outputted from said digital interface circuit.

37. A digital information recording apparatus according to claim 34, wherein:

said controller controls said digital interface circuit, said decryptor, said selector and said recorder in response to said first copy control information outputted from said digital interface circuit.

38. A digital information recording apparatus according to claim 34, wherein:

said first digital information includes at least one of encrypted information and non-encrypted information.

39. A digital information recording apparatus according to claim 34, wherein:

said first copy control information denotes one of:

a copy inhibition prohibiting copying of said first digital information;

a limited copy permission authorizing a predetermined number of times of copying of said first digital information; and an unlimited copy permission authorizing unlimited copying of said first digital information.

40. A digital information recording apparatus according to claim 34, wherein:

said controller controls said digital interface circuit so as to select said first digital information outputted from said digital interface circuit in response to said unlimited copy permission authorizing unlimited copying of said first digital information; and said controller controls said digital interface circuit so as to select said decrypted second digital information outputted from said decryptor in response to said limited copy permission authorizing a predetermined number of times of copying of said first digital information.

41. A digital information recording apparatus according to claim 34, further comprising:

a copy modifier to modify said first copy control information into second copy control information in response to said first copy control information;

wherein said controller controls said recorder so as to record a selected one of said first digital information and said decrypted second digital information as well as said second copy control information.

42. A digital Information recording apparatus according to claim 41, wherein:

said first copy control information denotes one of:

a copy inhibition prohibiting copying of said first digital information;

a limited copy permission authorizing a predetermined number of times of copying of said first digital information; and an unlimited copy permission authorizing unlimited copying of said first digital information.

43. A digital information recording apparatus according to claim 42, wherein:

said copy modifier, upon reaching said predetermined number of times of copying, modifies said limited copy permission authorizing a predetermined number of times of copying of said first digital information into said copy inhibition of said first digital information as said second copy control information in response to said first copy control information.

\* \* \* \* \*